(12) United States Patent
Natarajan et al.

(10) Patent No.: US 8,580,464 B2
(45) Date of Patent: *Nov. 12, 2013

(54) REVERSE SATURABLE ABSORBTION SENSITIZERS FOR OPTICAL DATA STORAGE MEDIA AND METHODS FOR USE

(75) Inventors: Arunkumar Natarajan, Niskayuna, NY (US); Patrick Joseph McCloskey, Watervliet, NY (US); Kwok Pong Chan, Troy, NY (US); Evgenia Mikhailovna Kim, Ballston Lake, NY (US); Robert Edgar Colborn, Niskayuna, NY (US); Eugene Pauling Boden, Scotia, NY (US)

(73) Assignee: General Electric Company, Schenectady, NY (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/299,029

(22) Filed: Nov. 17, 2011

(65) Prior Publication Data

US 2013/0128713 A1 May 23, 2013

(51) Int. Cl.
*G03H 1/02* (2006.01)
*C09D 11/00* (2006.01)
*C07D 209/04* (2006.01)
*C07F 5/02* (2006.01)

(52) U.S. Cl.
USPC .................. 430/1; 430/2; 430/290; 548/405; 548/110; 546/13; 106/31.47

(58) Field of Classification Search
None
See application file for complete search history.

(56) References Cited

U.S. PATENT DOCUMENTS

| 3,782,938 | A | * | 1/1974 | De Boer | 430/287.1 |
| 6,368,395 | B1 | * | 4/2002 | Nohr et al. | 106/31.47 |
| 8,182,967 | B2 | * | 5/2012 | Natarajan et al. | 430/1 |
| 2008/0158627 | A1 | | 7/2008 | Lawrence et al. | |
| 2011/0051586 | A1 | | 3/2011 | Natarajan et al. | |
| 2011/0053054 | A1 | | 3/2011 | Natarajan et al. | |
| 2011/0053055 | A1 | | 3/2011 | Natarajan et al. | |
| 2011/0080823 | A1 | * | 4/2011 | Watkins et al. | 369/275.1 |
| 2012/0052232 | A1 | * | 3/2012 | Natarajan et al. | 428/64.4 |
| 2013/0128712 | A1 | * | 5/2013 | Natarajan et al. | 369/103 |

FOREIGN PATENT DOCUMENTS

| EP | 2290650 | * | 3/2011 |
| EP | 2290651 | * | 3/2011 |
| JP | 11-024255 | * | 1/1999 |
| JP | 2005-290259 | * | 10/2005 |

OTHER PUBLICATIONS

Liu et al., "Highly efficient energy transfer in subphthalocyanine-BODIPY conjugates", Org. Lett., vol. 10(23) pp. 5421-5424.*

(Continued)

*Primary Examiner* — Martin Angebranndt
(74) *Attorney, Agent, or Firm* — Jean Testa; Fletcher Yoder

(57) ABSTRACT

The invention relates generally to optical data storage media, and more specifically, to holographic storage media. In one embodiment, an optical storage medium composition includes a polymer matrix. Disposed within the polymer matrix is a reactant capable of undergoing a modification that alters the refractive index of the composition upon receiving an energy transfer from an excited sensitizer. A non-linear sensitizer is also disposed within the polymer matrix, and the sensitizer includes a metal-substituted subphthalocyanine (M-sub-PC) reverse saturable absorber configured to become excited upon exposure to light beyond an intensity threshold at approximately 405 nm and configured to transfer energy to the reactant.

23 Claims, 11 Drawing Sheets

(RSA₁)

(RSA₂)

(56) References Cited

OTHER PUBLICATIONS

Khouly et al., "Supermolecular tetra of subpthalocyanine-triphenylamine-Zinc porphyrin . . . " Chem Eur. J., vol. 16 pp. 6193-6202 (Jun. 2010).*

Xu et al., "Formation and energy transfer property of a subphthalocyanine-porphyrin complex held by host-guest interactions", Phys. Chem.,Chem. Phys., vol. 12 pp. 7366-7370 (Jun. 2010).*

Urano et al. "sensitization mechanisms of subpthalocyanine in photopolymer coating layer", J. Photopoly. Sci., vol. 13(5) pp. 679-684 (2000).*

Minsk et al, "Photosensitive polymers. I. Cinnamate esters of poly(vinyl alcohol) and cellulose", J. Appl. Poly. Sci., vol. II(6) pp. 302-307 (1959).*

Robertson et al, "Photosensitive polymers. II. Sensitization of poly(vinyl cinnamate)", J. Appl. Poly. Sci., vol. II(6) pp. 308-311 (1959).*

Xu et al. "construction of subpthalocyanine-porphyrin and suphthalocyanine-phthalocyanine hetrodyads through axial coordination", Inorg. Chem., vol. 47(17) pp. 7921-7927 (2008).*

Kobayashi et al., "Low symmetrical phthalocyanine analogues substituted with three crown ether voids and their cation induced supermolecules", JACS vol. 118 (5) pp. 1073-1085 (1996).*

* cited by examiner

REVERSE SATURABLE ABSORBTION SENSITIZERS FOR OPTICAL DATA STORAGE MEDIA AND METHODS FOR USE

BACKGROUND

The invention relates generally to optical data storage media, and more specifically, to holographic storage media.

Optical storage media generally provide an effective platform for archiving data, offering numerous advantages over other forms of data storage in terms of cost of the medium, life expectancy of the stored data, the amount of time required to write data, and the amount of time required to access the data. Holographic storage is a specific type of optical storage in which data is written to and read from the optical medium as holograms. These holograms are images formed by the interaction of multiple beams of light in a photosensitive layer within the volume of a holographic medium. That is, for example, using a combination of a reference light beam and a signal light beam, a three-dimensional interference pattern may be formed in the holographic medium as certain species present are chemically modified by the beams, modulating the refractive index of specific portions of the holographic medium.

In such a holographic medium, a reverse saturable absorber (RSA) may be used as an energy-transfer threshold dye. In general, an energy-transfer threshold dye may be generally responsible for absorbing recording light (e.g., from the reference beam and signal beam) and causing a chemical reaction to occur. That is, when the recording light is beyond a particular intensity threshold, the RSA dye may be absorb multiple photons of recording light and then transfer the energy of the excited state to a reactant species (e.g., an index change material). In response, the reactant species may undergo a chemical reaction (e.g., dimerization reactions, isomerization reactions, or inter- or intra-molecular condensation reactions), which may cause a localized change in the refractive index of the holographic medium, essentially capturing the intensity and phase of the recording light. Subsequently, upon interrogating the holograms using a lower intensity of light, this captured information may be recovered in a nondestructive fashion such that the associated encoded data may be deciphered. However, the RSA dye should have sufficient sensitivity to enable efficient recording of data to the holographic medium.

BRIEF DESCRIPTION

In one embodiment, an optical storage medium composition includes a polymer matrix. Disposed within the polymer matrix is a reactant capable of undergoing a modification that alters the refractive index of the composition upon receiving an energy transfer from an excited sensitizer. A non-linear sensitizer is also disposed within the polymer matrix, and the sensitizer includes a metal-substituted subphthalocyanine (M-sub-PC) reverse saturable absorber configured to become excited upon exposure to light having an intensity above an intensity threshold and configured to transfer energy to the reactant.

In another embodiment, a sensitizer having the general formula:

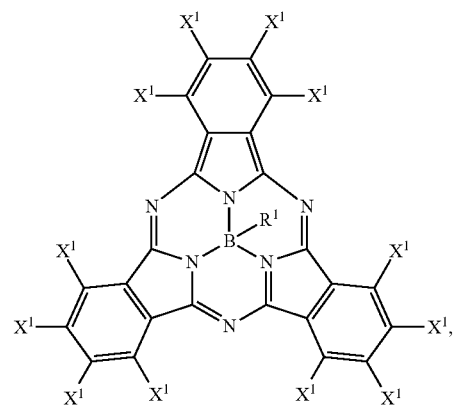

wherein:
each $X^1$ independently comprises: a proton, a halide, an hydrocarbyl group having between 1 and 10 carbons, or an alkoxy group having between 1 and 10 carbons; and $R^1$ comprises any functional group or collection of functional groups configured to bind a metal.

In another embodiment, a method for storing data on an optical medium includes irradiating a portion of the optical medium with recording light having an intensity above an intensity threshold, wherein the optical medium comprises a metal-substituted subphthalocyanine (M-sub-PC) reverse saturable absorber (RSA) and a reactant disposed within a polymer matrix. The method also includes exciting the M-sub-PC RSA to an excited triplet state with the recording light such that the excited M-sub-PC RSA sensitizes a modification of the reactant. The method also includes modifying the reactant such that the refractive index of the portion of the optical medium is altered, forming a hologram on optical medium, wherein the hologram stores information about the intensity and phase of the recording light.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

It should be generally noted that, as used herein, "fluence" is a measure of the amount of optical beam energy that has traversed a unit area if the beam cross-section (e.g., in units of Joules/cm$^2$), while "intensity", also known as optical radiative flux density, is a measure of the energy that has traversed a unit area of the beam cross-section per unit time (e.g., in units of Watts/cm$^2$). Furthermore, the term "quantum efficiency", as used herein, is the probability an absorbed photon will result in a chemical transformation that modulates the refractive index of an optical medium. Additionally, the "sensitivity" of a particular holographic medium generally refers to the quantum efficiency of a holographic medium (e.g., when recording light of relatively low intensity is used).

The disclosed embodiments describe optical media suitable for holographic data storage as well as methods for using such a platform for data storage. Generally speaking, a holographic medium may include a non-linear sensitizer species and a reactant species disposed together in a polymer matrix. The non-linear sensitizer species may be a reverse saturable absorber (RSA) dye and, in particular, may be a metal-substituted subphthalocyanine (M-sub-PC) RSA dye. As described in detail below, these M-sub-PC dyes afford both the aforementioned energy-transfer threshold behavior and relatively high quantum efficiencies when using relatively low-intensity recording light. An optical media utilizing these M-sub-PC RSA dyes afford greater sensitivity and efficiency during the recording process than other materials previously described.

Figure 1:
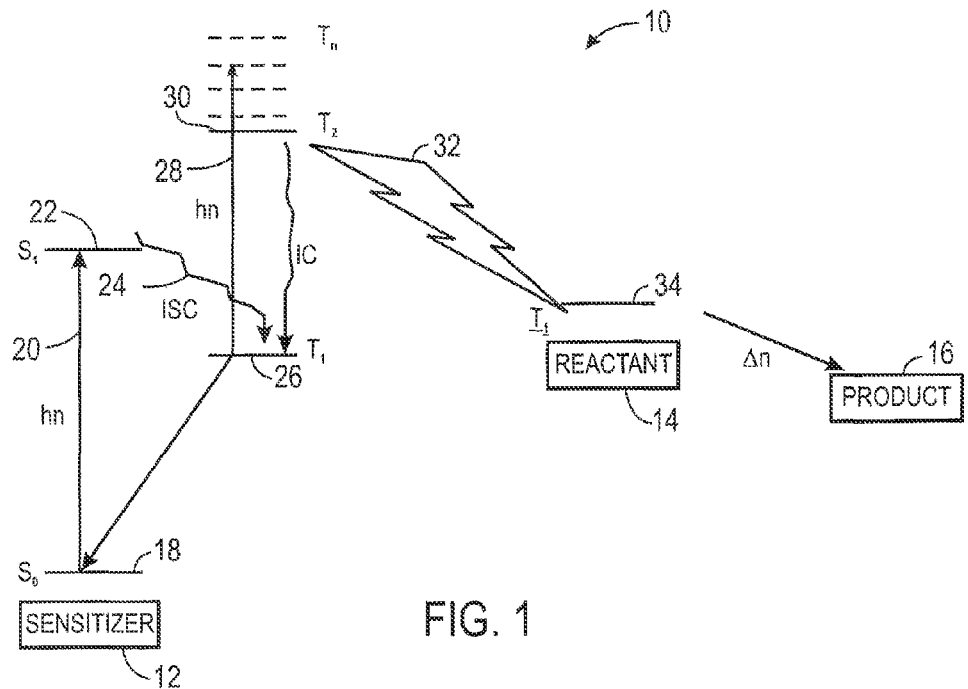
FIG. 1 is an energy level diagram illustrating excitation of the sensitizer and energy transfer to the reactant, in accordance with aspects of the present disclosure.

Generally speaking, an RSA dye exhibits a non-linear response to the recording light (i.e., actinic radiation). FIG. 1 depicts an energy diagram 10 that illustrates the interactions of various energy levels present within an optical medium. More specifically, FIG. 1 illustrates some possible interactions between certain energy levels of a sensitizer 12 (e.g., the M-sub-PC RSA dye), the reactant species 14, and the resulting product 16. In general, the sensitizer 12 in its ground state, $S_0$ 18, does not substantially absorb photons of the recording light. However, if the intensity of the recording light is beyond a particular threshold, then the sensitizer 12 may become excited (e.g., via a first photon absorption 20) to reach an excited singlet state (e.g., $S_1$ 22). At some point after initial absorption 20, the sensitizer 12 may undergo intersystem crossing (ISC) 24 to arrive at an excited triplet state (e.g., $T_1$ 26). This triplet state 26 may generally have a higher absorption cross-section than the singlet ground state $S_0$ 18 and, accordingly, be a substantially stronger absorber of the recording light (i.e., a non-linear response to the actinic radiation). As such, the sensitizer 12 may absorb 28 another photon of the recording light to reach an excited triplet state RSA$^{3*}$ (e.g., $T_2$ 30). Accordingly, after absorbing two photons of the recording light, the sensitizer 12 may then transfer 32 the energy of the excited triplet state (e.g., $T_2$ 30) to a triplet energy level (e.g., $T_1$ 34) of the reactant species 14 present in the holographic medium. The reactant 14, having received this energy transfer, may subsequently chemically react (e.g., dimerize with another reactant unit present) to afford the product 16 as well as the aforementioned change in the refractive index of the holographic medium that produces the hologram. After sensitizing the triplet state $T_1$ 34 of the reactant species 14, the sensitizer 12 may return to the ground state $S_0$ 18 to continue the process.

While one energy pathway is presented in FIG. 1, it should be appreciated that a number of other energy pathways (e.g., including other absorption, decays, and conversions) within the system are possible. For example, in certain embodiments, after the sensitizer 12 (e.g., a M-sub-PC) has absorbed both photons to reach an excited triplet state (e.g., $T_2$ 30), the sensitizer 12 may also pass the energy to a nearby reactant 14 in non-radiative manner (e.g., as heat energy). In such embodiments, the reactant 14 may undergo a phase change (e.g., amorphous-to-crystalline or vice versa) as a result of receiving the heat-energy from the excited sensitizer 12, which may result in a change in the refractive index of the holographic medium.

Figure 2:
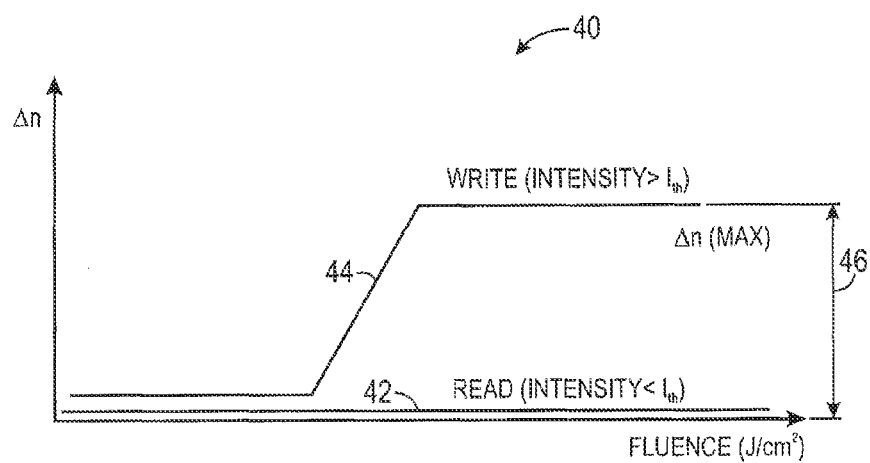
FIG. 2 is a graph illustrating the non-linear absorption of a threshold sensitizer, in accordance with aspects of the present disclosure.

Accordingly, only regions of the optical medium that receive sufficient recording light (e.g., beyond the intensity threshold) may experience a localized change in refractive index. To better illustrate this effect, FIG. 2 demonstrates the threshold response of an optical medium utilizing an RSA dye to light of varying fluence. More specifically, FIG. 2 illustrates a plot 40 of the change in the index of refraction (e.g., Δn) of a threshold material (e.g., an optical medium including an RSA dye and a reactant species) over a range of light fluences. The illustrated plot 40 includes two curves: one curve 42 representing a read operation, and another curve 44 representing a write operation with the holographic medium. In curve 42, the intensity of the incident light is below the threshold (e.g., $I_{th}$) of the RSA material and, accordingly, regardless of the fluence of the light incident on the material, there is no substantial change in the refractive index of the optical medium. In contrast, curve 44 illustrates that when the RSA material is irradiated with light having an intensity above the threshold (e.g., $I_{th}$) of the RSA material (as well as sufficient fluence) a substantial modulation 46 of the refractive index of the threshold material may be observed. Accordingly, an optical medium utilizing such an RSA dye may exhibit this non-linear response to recording light. That is, the optical medium may not demonstrate any substantial change in refractive index when the actinic light is below a certain intensity threshold, but demonstrate a significant change of the refractive index when the actinic light is above a certain intensity threshold (e.g., demonstrated in curve 44). Furthermore, the hologram written by this change in the refractive index may be interrogated using light below this intensity threshold (e.g., $I_{th}$) such that the holographic medium may not be substantially altered during the reading process (e.g., demonstrated in curve 42).

Figure 3:
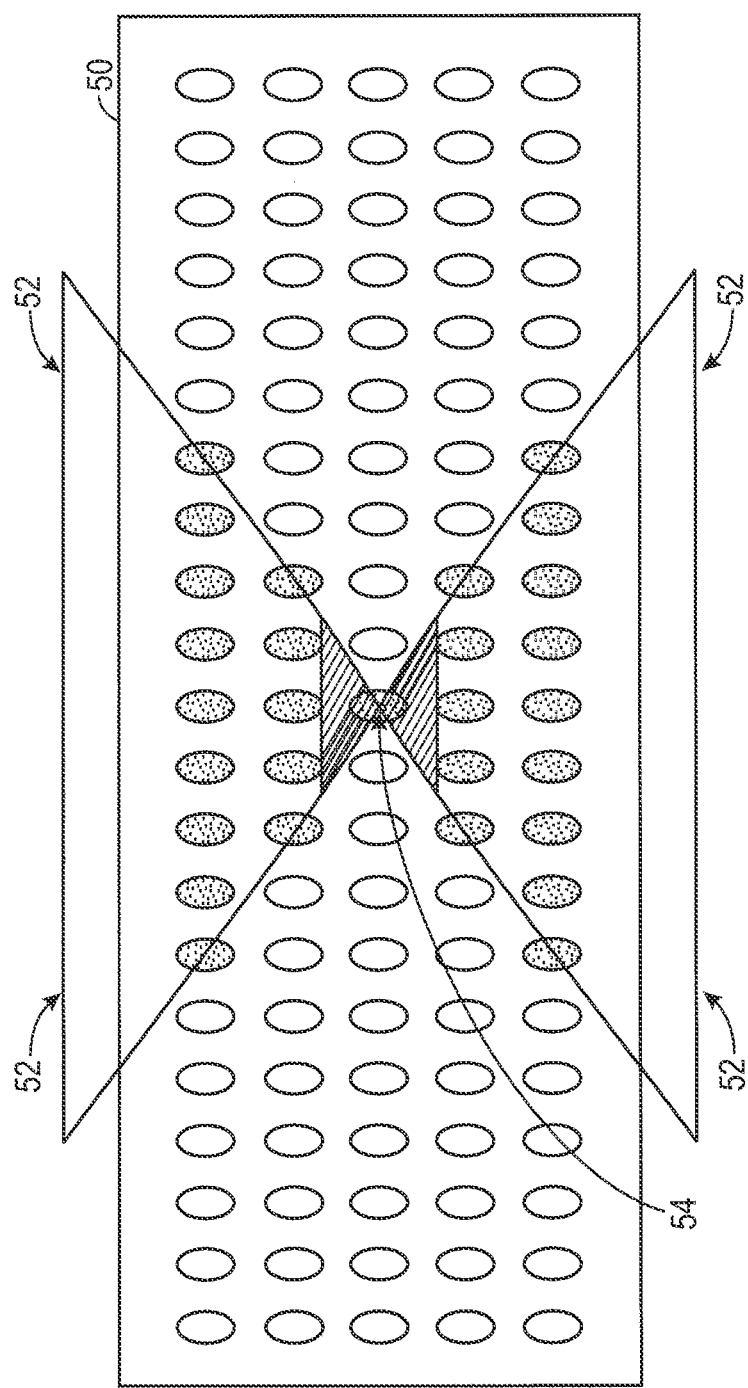
FIG. 3 is a cross-sectional view of an optical storage medium being irradiated with recording light, in accordance with aspects of the present disclosure.

To further illustrate how data may be written to the holographic medium, FIG. 3 depicts a cross-sectional view a holographic medium 50 being exposed to recording light. More specifically, FIG. 3 illustrates a holographic medium 50 that includes an RSA dye and a reactant species disposed together in a polymer matrix. Additionally, FIG. 3 illustrates the volume 52 of the holographic medium 50 through which the recording light (e.g., the actinic radiation, including a reference and signal beam) passes. Since the holographic medium 50 utilizes an RSA dye, the entire volume 52 of the holographic medium 50 does not receive sufficient recording light (e.g., above the intensity threshold of the RSA dye) to affect the modulation of the refractive index. Rather, only the focal point 54 (e.g., the intersection of the reference and signal beams), receives recording light above the intensity threshold of the RSA dye and, accordingly, experiences a change in the refractive index, resulting in the writing of a hologram into the holographic medium. Accordingly, use of the RSA dye obviates undesirable chemical modifications in portions of the medium located near a hologram that is being written.

An optical medium may, in general, include an RSA dye (e.g., a M-sub-PC RSA dye) and a reactant species disposed together within a polymer matrix. In general, the polymer matrix of the holographic medium may be any polymer commonly used in the production of optical media. For example, the polymer may include polyalkyl (methacrylates) (PMMAs), polyvinyl alcohols, poly(alkyl acrylates), polystyrenes, polycarbonates, poly acrylates, poly(vinylidene chloride), and poly(vinyl acetate). Additionally, in certain embodiments, the reactant species may be used to functionalize the polymer backbone (e.g., via an ester linkage to polyvinyl alcohol), as discussed in detail below. In certain embodiments the reactant species units may be non-covalently associated with the polymer backbone (e.g. via. ionic interaction, hydrogen bonding, etc.). Furthermore, the RSA dye may be used in amounts of from about 0.002 weight % to about 5 weight % based upon the total weight of the composition. In certain embodiments, the RSA dye may have a concentration between approximately 0.01 M and 0.1 M, or a concentration of approximately 0.4 M. Also, the support for the holographic medium may be provided by a number of commonly employed polymer materials, including polymethyl (methacrylate) PMMA, polycarbonates, poly(ethylene terephthalate), poly(ethylene naphthalene), polystyrene, or cellulose acetate. Additionally, the holographic medium may also include mediators, photostabilizers, plasticizers commonly known in the art.

In general, the reactant species may be any species having a triplet state capable of undergoing a reaction (e.g., dimerization or isomerization) or a phase change (e.g., amorphous-to-crystalline or vice versa) that results in a change in the index of refraction of the holographic material. For example, in certain embodiments, the reactant species may be a phase-change polymer composition as disclosed in U.S. patent application Ser. No. 11/901,725, entitled, "Method for storing holographic data", which is incorporated by reference herein in its entirety for all purposes. In certain embodiments, the reactant may be any species capable of undergoing a refractive-index altering molecular rearrangement (e.g., [2+2] dimerization) upon being sensitized to an excited triplet state by an excited RSA sensitizer (i.e., $RSA^{3*}$). As such, suitable reactants include, but are not limited to, various types of stilbenes, included halogenated stilbenes, alkylated stilbenes, cyano stilbenes, alkoxy stilbenes, or any combination thereof. Additionally, U.S. patent application Ser. No. 12/550, 521, entitled, "OPTICAL DATA STORAGE MEDIA AND METHODS FOR USING THE SAME", which is incorporated by reference herein in its entirety for all purposes, discloses examples of cinnamate analogues that may serve as the reactant species in the holographic medium. For example, in certain embodiments, one or more cinnamate units may be bound to a polymer backbone (e.g., polyvinyl alcohol) to produce a polymer structure (e.g., polyvinylcinnamate). Accordingly, when nearby cinnamate units of a polyvinylcinnamate encounter an excited $RSA^{3*}$ species (e.g., an excited M-sub-PC unit), an indirect photodimerization reaction may occur as indicated below:

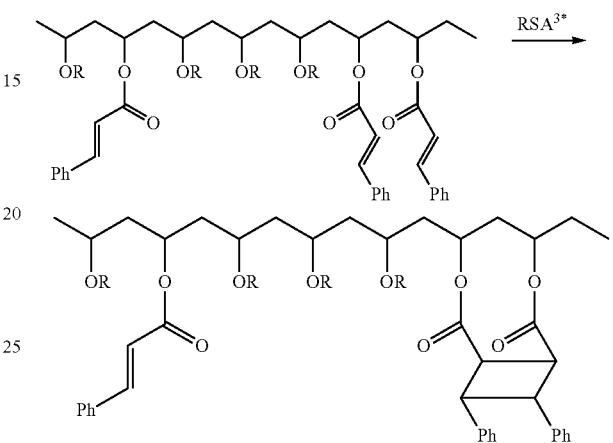

Furthermore, in certain embodiments, the reactant species may be a diphenylcyclopropene (DPCP) derivative (e.g., 2,3-diphenylcycloprop-2-enecarboxylate) disclosed in the co-pending U.S. patent application Ser. No. 13/299,021, filed concurrently herewith, entitled "REACTANTS FOR OPTICAL DATA STORAGE MEDIA AND METHODS FOR USE", which is incorporated by reference herein in its entirety for all purposes. In certain embodiments, a polymer backbone (e.g., polyvinyl alcohol) may be derivatized by DPCP units to form a polyvinyl-DPCP structure. Accordingly, when nearby DPCP units of a polyvinyl-DPCP structure encounter an excited $RSA^{3*}$ species (e.g., an excited M-sub-PC unit), an indirect photodimerization reaction may occur as indicated below:

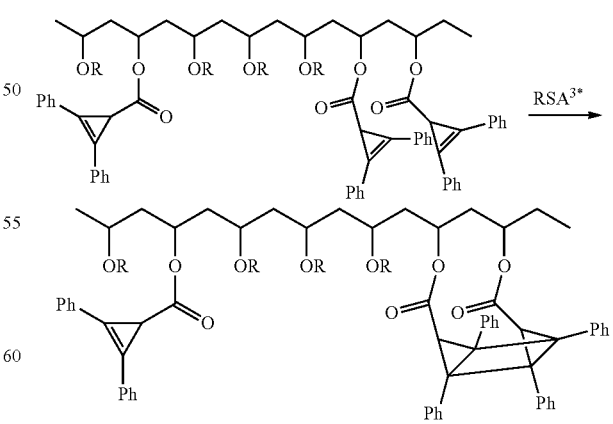

For cinnamate analogues, DPCP analogues, as well as other unsaturated reactant species, a [2+2] cyclization may occur between the unsaturated bonds of two reactant units (e.g., dimerization) once energy has been transferred into the triplet energy level (e.g., $T_1$ 34) by the excited RSA dye. Accordingly, once the RSA dye has absorbed the two photons (e.g., absorptions 20 and 28) of recording light to reach an excited triplet state (e.g., $T_2$ 30), the RSA dye may transfer the energy of the excited triplet state 30 a reactant unit (e.g., a cinnamate-derivative or DPCP-derivative unit) such that two reactant units may undergo indirect photodimerization. Once a substantial number of photodimerization events between reactant units have occurred, a localized change in the index of refraction of the holographic medium may be observed.

In the production of an optical medium, it is generally desirable to employ RSA dyes having relatively high quantum efficiencies. That is, it is generally desirable to utilize RSA dyes capable of causing a greater number of reactant molecules to react at low recording light intensity. This high quantum efficiency enables the RSA dye to efficiently drive the chemical reaction responsible for the modulation of the index of refraction of the holographic medium using lower intensity light (e.g., fewer total photons). Accordingly, less energy may be consumed during the recording process, a greater number of reactant molecules may be converted during a write operation, and/or recording times may be reduced.

In particular, U.S. patent application Ser. No. 12/551,455, entitled, "COMPOSITIONS, OPTICAL DATA STORAGE MEDIA AND METHODS FOR USING THE OPTICAL DATA STORAGE MEDIA", which is incorporated by reference herein in its entirety for all purposes, discloses the use of a particular non-linear sensitizer, namely subphthalocyanine (sub-PC), as an RSA dye for optical storage media. The sub-PC structure affords good RSA behavior using recording light at about 405 nm (±10 nm). An example of a sub-PC is shown below:

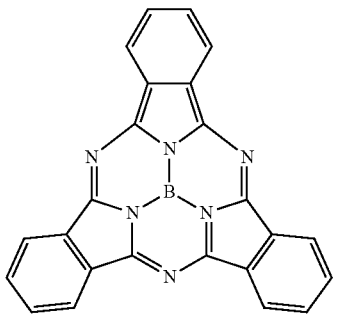

Present embodiments are directed toward the modification of the sub-PC structure to include one or more functional groups bearing at least one metal atom. As such, it should be noted that, while a particular sub-PC structure is included above, this presently disclosed modification is contemplated for any sub-PC structure. That is, any subphthalocyanine RSA that substantially responds to radiation at a wavelength less than approximately 500 nm (e.g., around 405 nm) may be modified according to the presently disclosed methods for use in optical data storage media.

The present disclosure addresses modifications to the sub-PC structure generally relating to the addition of functionality capable of binding a metal atom to a sub-PC core structure. That is, the present embodiments include metal-subphthalocyanine (M-sub-PC) derivatives, which incorporate metal-containing functional groups or moieties into the sub-PC structure. For example, a general structure of a M-sub-PC is shown below:

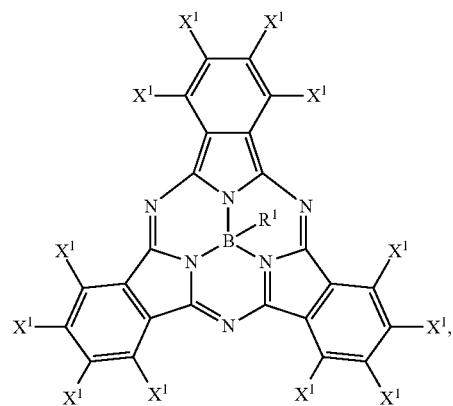

where $R^1$ may generally be any functional group capable of binding or chelating one or more metal atoms; and each $X^1$ may independently be either a proton, a halide (e.g., bromide, fluoride, chloride, iodide, etc.), a hydrocarbyl group (e.g., methyl, ethyl, t-butyl, etc.), or an alkoxy (e.g., methoxy, ethoxy, etc.) group. Examples of suitable subphthalocyanines (sub-PC) core structures include, but are not limited to: 2,9,16-tribromosubphthalocyanato boron(III); 2,9,16-triiodosubphthalocyanato boron(III); trinitrosubphthalocyanato boron(III); 2,9,16-tri-tertbutylsubphthalocyanato boron(III); 2,9,17-tri-tert-butylsubphthalocyanato boron(III); and 2,9,16-triiodosubphthalocyaninato boron(III). Any of these, as well as any other subphthalocyanine core structures affording RSA behavior at a wavelength of about 405 nm, may be utilized. Furthermore, it should be noted that, while in the structure included above, $R^1$ is illustrated as being bound to the boron atom, in other embodiments a metal-bearing functionality $R^1$ may be bound to any other atom of the sub-PC structure (e.g., a carbon or nitrogen atom anywhere in the structure). Furthermore, it should be noted that, in certain M-sub-PC embodiments, multiple metal-bearing groups (e.g., $R^1$, $R^2$, etc.) may be used to derivatize the sub-PC structure. For example, in certain embodiments, the M-sub-PC structure may (in addition or in alternative to having a metal-bearding group, $R^1$, bound to the boron atom) have other metal-bearing group bound to a different atom in the structure (i.e., $X^1$ may also include $R^1$ or $R^2$).

Generally speaking, $R^1$ is a functional group or a collection of functional groups that couple a metal center to the sub-PC core structure. Accordingly, $R^1$ may be described by the general formula:

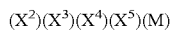

where each of $X^2$, $X^3$, $X^4$, $X^5$, and M represent a portion of the structure $R^1$ comprising one or more atoms, as discussed in detail below. As presented in detail below, $X^2$ is a point of attachment for $R^1$ to the sub-PC core structure; $X^3$ is a linker portion of $R^1$; $X^4$ is the metal binding portion of $R^1$; and M is the attached metal center along with a number of associated ligands or counter-ions, $X^5$. It should be appreciated that a single connection or bond may exist between the various portions of $R^1$ (e.g., $X^2$, $X^3$, $X^4$, $X^5$, and M), or in certain embodiments, two or more bonds may couple these portions together (e.g., through multiple points of attachment or multiple bonds to the same point of attachment). It should be further appreciated that bonds, as presently used, refers to any chemical bond or attractive force between two atoms, including covalent bonding (e.g., normal covalent bonding and coordinate covalent bonding) and non-covalent bonding (e.g., ionic interactions, hydrogen bonding, columbic attraction, or similar interaction). Furthermore, while various combinations of points of attachment ($X^2$), linkers, ($X^3$), metal binding portions, ($X^4$), metals (M), and ligands/counter-ions ($X^5$) are included in example structures below, it should be appreciated that many other combinations of $X^2$, $X^3$, $X^4$, $X^5$, and M are also possible and may also be used.

Generally speaking, the sensitivity of each optical medium may be assessed by considering how much the refractive index of each optical medium changes when irradiated using actinic light. As such, the two curves of FIG. 7 (e.g., 62 and 64) may be compared to assess the relative sensitivity of the corresponding reactant species. For curve 62, representing the cinnamate-derivative, PV-COO-cinnamate, a Δn of approximately $3.0 \times 10^{-4}$ is observed when using recording light of approximately 800 MW/cm². In contrast, curve 64, corresponding to the DPCP-derivative, PV-COO-DPCP, illustrates a Δn of approximately $7.0 \times 10^{-4}$ when using recording light of approximately the same intensity. Accordingly, a substantial improvement in sensitivity is observed for the holographic media utilizing DPCP-derivative reactant species compared to the medium utilizing the cinnamate-derivative reactant species. More specifically, an approximately two-fold to three-fold increase in the Δn of holographic media utilizing the DPCP-derivative reactant species is observed when the media is exposed to recording light.

Additionally, in certain embodiments, $R^1$ may also include a linker, $X^3$, which may couple the point of attachment ($X^2$) to the metal binding portion ($X^4$). In general, $X^3$ may be any atom or series of atoms (e.g., carbon, nitrogen, oxygen, and/or protons) capable of coupling $X^2$ to $X^4$. It should be appreciated that the structure of $X^3$ may be selected to provide particular properties. That is, in certain embodiments, $X^3$ may be an alkyl chain (e.g., 1 to 10 carbons in length) selected to provide a non-conjugated, flexible connection to the metal binding portion ($X^4$). In other embodiments, $X^3$ may be a conjugated structure (e.g., an arene ring, a polyaromatic structure, a conjugated chain, or similar structure) selected to provide a conjugated and/or less-flexible connection to the metal binding portion ($X^4$). In other embodiments, R may not include a linker $X^3$ and, as such, the point of attachment ($X^2$) may be directly attached to the metal-binding portion of the structure ($X^4$). In still other embodiments, linkers ($X^3$) having both saturated and unsaturated portions may be used in particular combinations to provide desired characteristics in terms of the position of the metal center relative to the sub-PC core structure, the electronic properties of the molecule between the metal center and the core structure, and the desired flexibility of the linker unit.

The metal atom(s) (M) incorporated into the metal binding portion ($X^4$) in the M-sub-PC structure may be any metal (e.g., indium, lead, zinc, rubidium, tin, cesium, or similar metal) or metalloid (e.g., thallium, antimony, or similar metalloid). Furthermore, in addition to the bonds to the metal bearing portion ($X^4$), M may include any number of ligands and/or counter-ions, $X^5$ (e.g., to coordinatively saturate the metal center). For example, in some embodiments, $X^5$ may comprise acetyl acetone (ACAC) ligands, nitrate ligands, hydrocarbyl ligands (e.g., methyl, ethyl, propyl, butyl), pyridine-based ligands, halide counter-ions (e.g., chlorine, bromine, iodine, fluorine, etc.), or any other ligands or counter-ions commonly known in the art. For example, in certain embodiments, the metal (M) may be a sodium, potassium, or rubidium atom used with an iodide counter ion ($X^5$). By further example, in certain embodiments, the metal (M) may be a thallium, lead, rubidium, or cesium atom with an iodide or nitrate counter-ion ($X^5$). By further example, in certain embodiments (M) may be an indium, lead, or zinc atom with two ACAC ligands or three butyl ligands ($X^5$). Furthermore, in certain embodiments, metal clusters comprising a plurality of metal atoms (and possibly a number of oxygen atoms) are also contemplated for use with the present techniques.

Furthermore, $R^1$ includes a metal binding portion ($X^4$) which enables $R^1$ to at least partially bind or chelate a metal atom (M). That is, $X^4$ may incorporate any functional group or moiety, or any collection of functional groups or moieties, commonly known in the art to be used for the attachment or chelating of metal atoms. Accordingly, generally speaking, $X^4$ may comprise a number of atoms (e.g., carbon, nitrogen, oxygen, boron, phosphorus, or sulfur) having one or more orbitals capable of interacting with the orbitals of the metal atom (M) such that the metal may be secured to the remainder of $R^1$. For example, as discussed in detail below, certain embodiments of $X^4$ may include, but are not limited to, crown-ether derivatives, diketone derivatives, pyridine derivatives, porphyrin derivatives, calixarene derivatives, cyclodextrin derivatives, or similar metal-binding structures.

Figure 4:
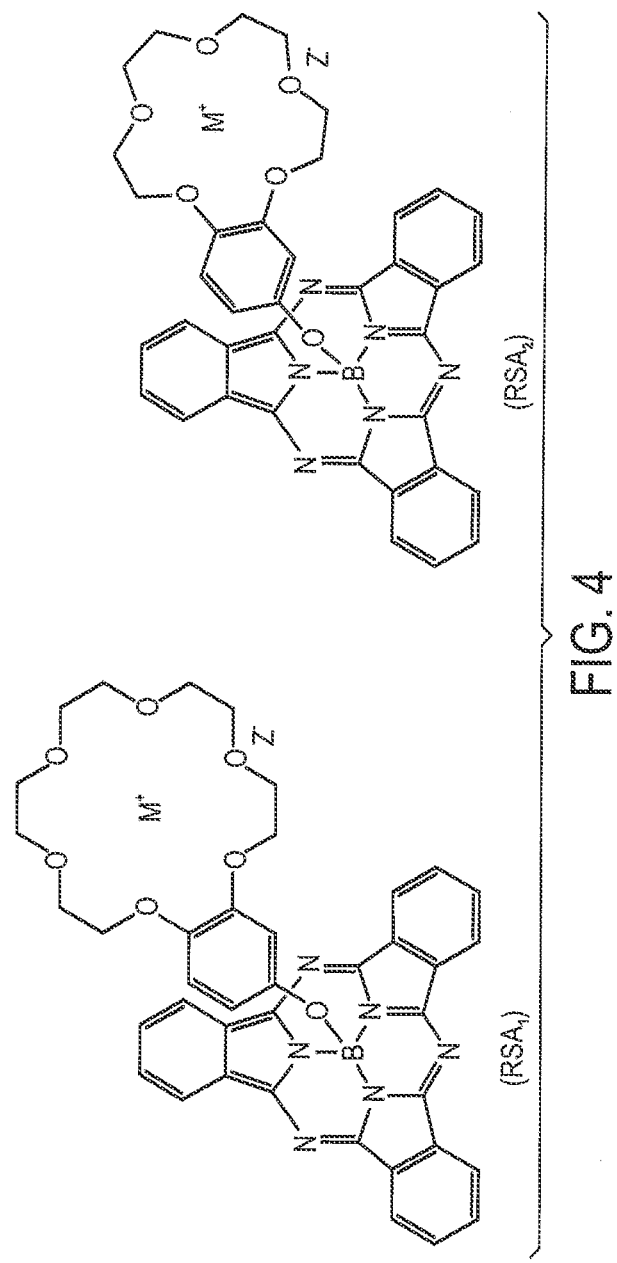
FIG. 4 illustrates examples of crown-ether-based M-sub-PC RSA dyes, in accordance with aspects of the present disclosure.

In certain embodiments, $R^1$ may be a crown-ether derivative according to the general structure included below:

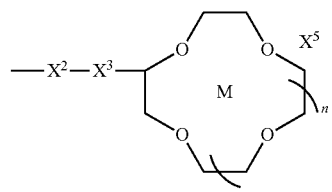

where n may be any integer from 1 to 10. By further example, $R^1$ may include, but is not limited to, the $R^1$ groups depicted for the example crown-ether derivative structures illustrated in FIG. 4. That is, FIG. 4 includes two crown-ether derivatives, namely: a 15-crown-5 derivative ($RSA_1$) and an 18-crown-6 derivative ($RSA_2$). It should be appreciated that while these two crown-ether derivatives are included above, any number of different sizes and types of hetero macrocycles may be used. For example, the crown-ether derivative portion of the M-sub-PC RSA dye (i.e., the metal binding portion $X^4$ of $R^1$) may be a 12-crown-4 ether derivative, a 21-crown-7 ether derivative, a 24-crown-8 ether derivative, or any other crown ether derivative. Examples demonstrating the synthesis of crown-ether derivatives are provided below.

Figure 5:
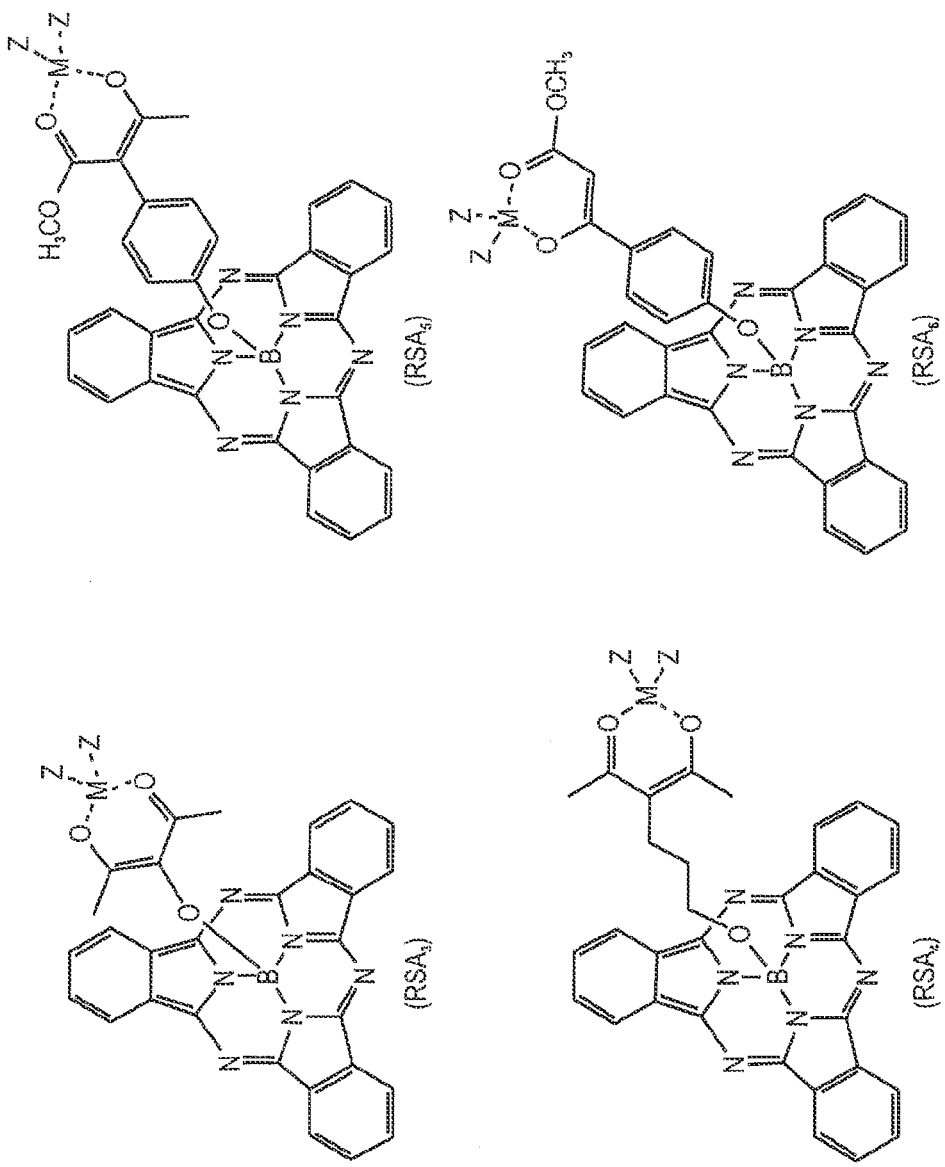
FIG. 5 illustrates examples of diketone-based M-sub-PC RSA dyes, in accordance with aspects of the present disclosure.

In certain embodiments, $R^1$ may also be a diketone (e.g., acetyl acetone (ACAC)) derivative as indicated by the general structures included below:

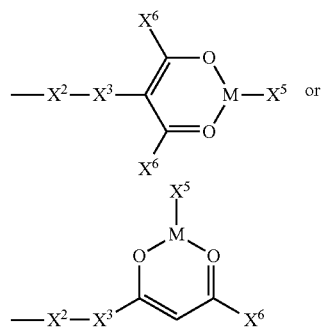

where each $X^6$ may independently be either a proton, a hydrocarbyl group having between 1 and 10 carbons, a hydroxyl group, an amino group, an alkyl amino group (e.g., dimethyl amine), an alkoxy group (e.g., methoxy, ethoxy, etc.), a halide (e.g., chlorine, bromine, iodine, fluorine, etc.), or similar species. By further example, $R^1$ may include, but is not limited to, the $R^1$ groups depicted for the example diketone M-sub-PC structures illustrated in FIG. 5. In particular, FIG. 5 illustrates diketone-based M-sub-PCs $RSA_3$ and $RSA_4$, which are similar ACAC-based M-sub-PCs, with M-sub-PC $RSA_4$ differing from M-sub-PC $RSA_3$ by three carbon alkyl linker portion ($X^3$). FIG. 5 also illustrates M-sub-PC $RSA_5$ and $RSA_6$, which are both methoxy-ACAC derivatives where $X^3$ is a phenylene unit. However, M-sub-PC $RSA_5$ illustrates the ACAC metal binding portion ($X^4$) as being coupled to the linker via the center carbon (i.e., between the carbonyl groups), while M-sub-PC $RSA_6$ illustrates the ACAC portion as being coupled to the linker via one of the carbonyl carbons. It should be appreciated that the diketones may be exist and/or be illustrated as either being the diketone or the enol tautomer.

Figure 6:
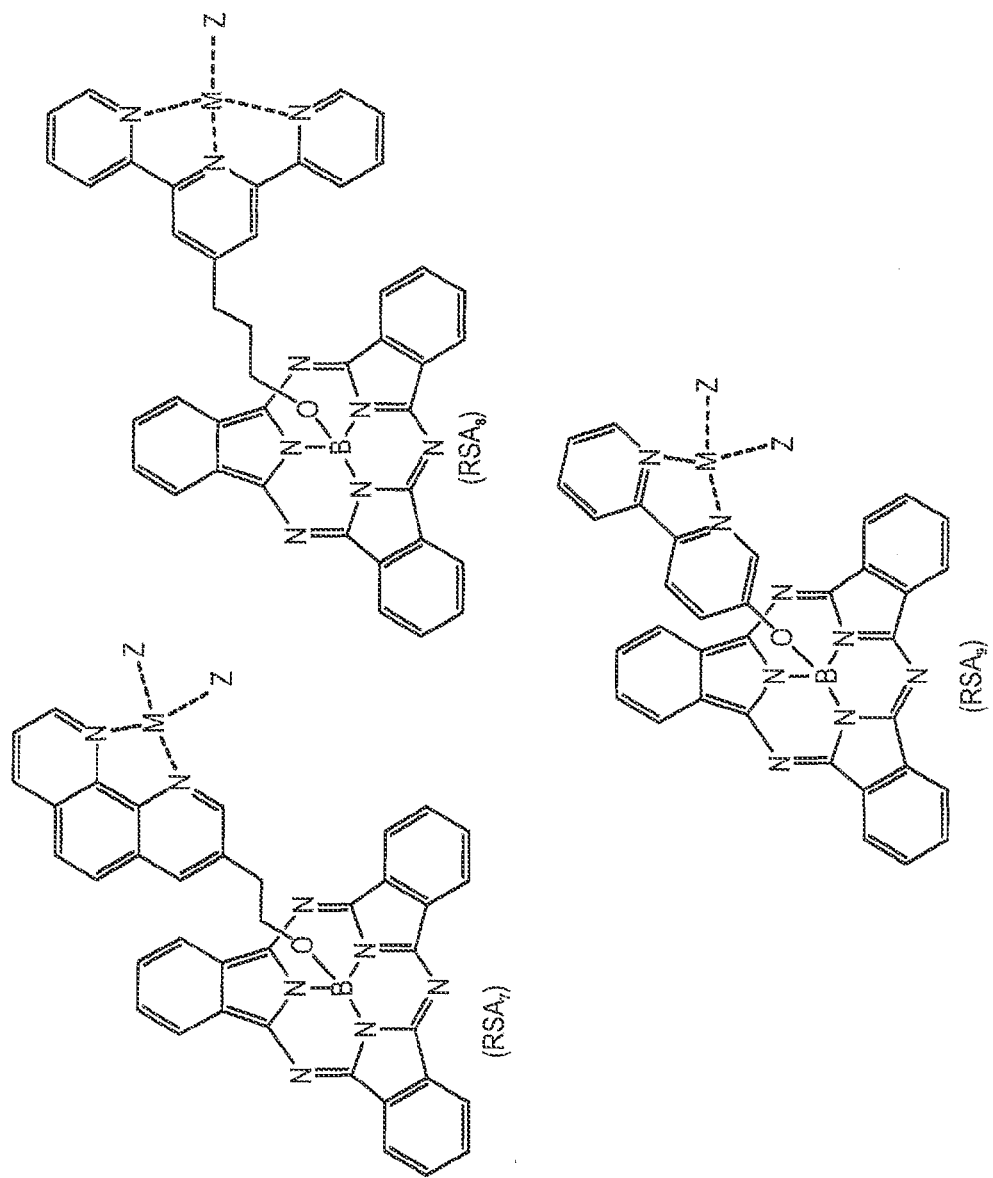
FIG. 6 illustrates examples of pyridine-based M-sub-PC RSA dyes, in accordance with aspects of the present disclosure.

In certain embodiments, $R^1$ may also be a pyridine derivative as indicated by the general structures shown below:

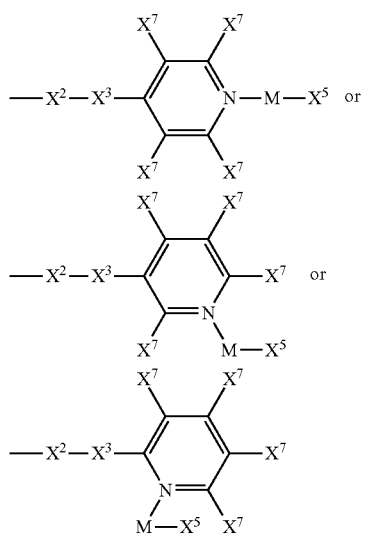

where each $X^7$ may independently be either a proton, a carboxylic acid group, an alkyl ester (e.g., a methyl ester) group, an amino group, an alkyl amino group (e.g., dimethyl amine), an alkoxy group (e.g., methoxy, ethoxy, etc.), a halide (e.g., chlorine, bromine, iodine, fluorine, etc.), a hydrocarbyl group having between 1 and 10 carbons, portions of another heteroarene (e.g., pyridine ring) or other arene structure, or similar species. By further example, $R^1$ may include, but is not limited to, the $R^1$ groups depicted for the example M-sub-PC structures illustrated in FIG. 6. In particular, FIG. 6 depicts a phenantherene-based M-sub-PC ($RSA_7$), terpyridine-based M-sub-PC ($RSA_8$), and bis-pyridine-based M-sub-PC ($RSA_9$). In the illustrated embodiments, bis-pyridine-based M-sub-PC $RSA_9$ lacks a linker ($X^3$) while the phenantherene-based M-sub-PC $RSA_7$ has a two carbon alkyl linker, and the terpyridine-based M-sub-PC $RSA_8$ has the longest, three carbon alkyl linker Additionally, it should be appreciated that while these three structures (e.g., $RSA_7$, $RSA_8$, and $RSA_9$) illustrate specific examples of pyridine derivative-based RSA dyes, other pyridine derivative-based RSA dyes may be utilized.

EXAMPLE 1

Synthesis of Metallated Subphthalocyanines (M-sub-PCs)

Benzo-15C5, Benzo-18C6, polyphosphoric acid, acetic anhydride, Metal salts and subphthalocyanine-chloride (all purchased from Aldrich) were used as received. $^1$H NMR spectra were obtained on a Bruker 400 MHz spectrophotometer. UV-Vis absorption spectra were obtained on Cary UV spectrophotometer.

Figure 7:
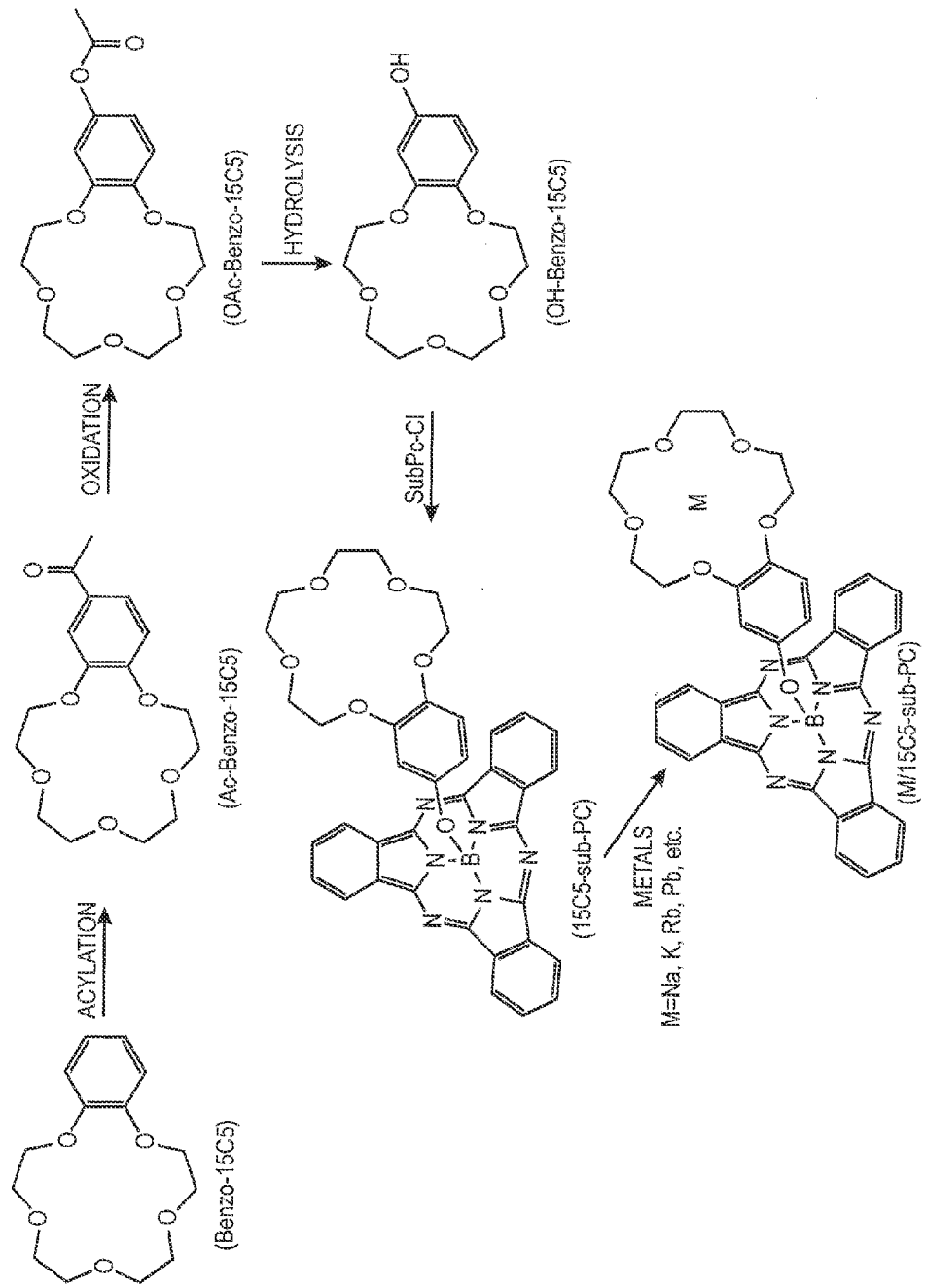
FIG. 7 is a schematic of a synthetic route for producing metal-substituted 15-crown-5 ether-based RSA dyes, in accordance with aspects of the present disclosure.
Figure 8:
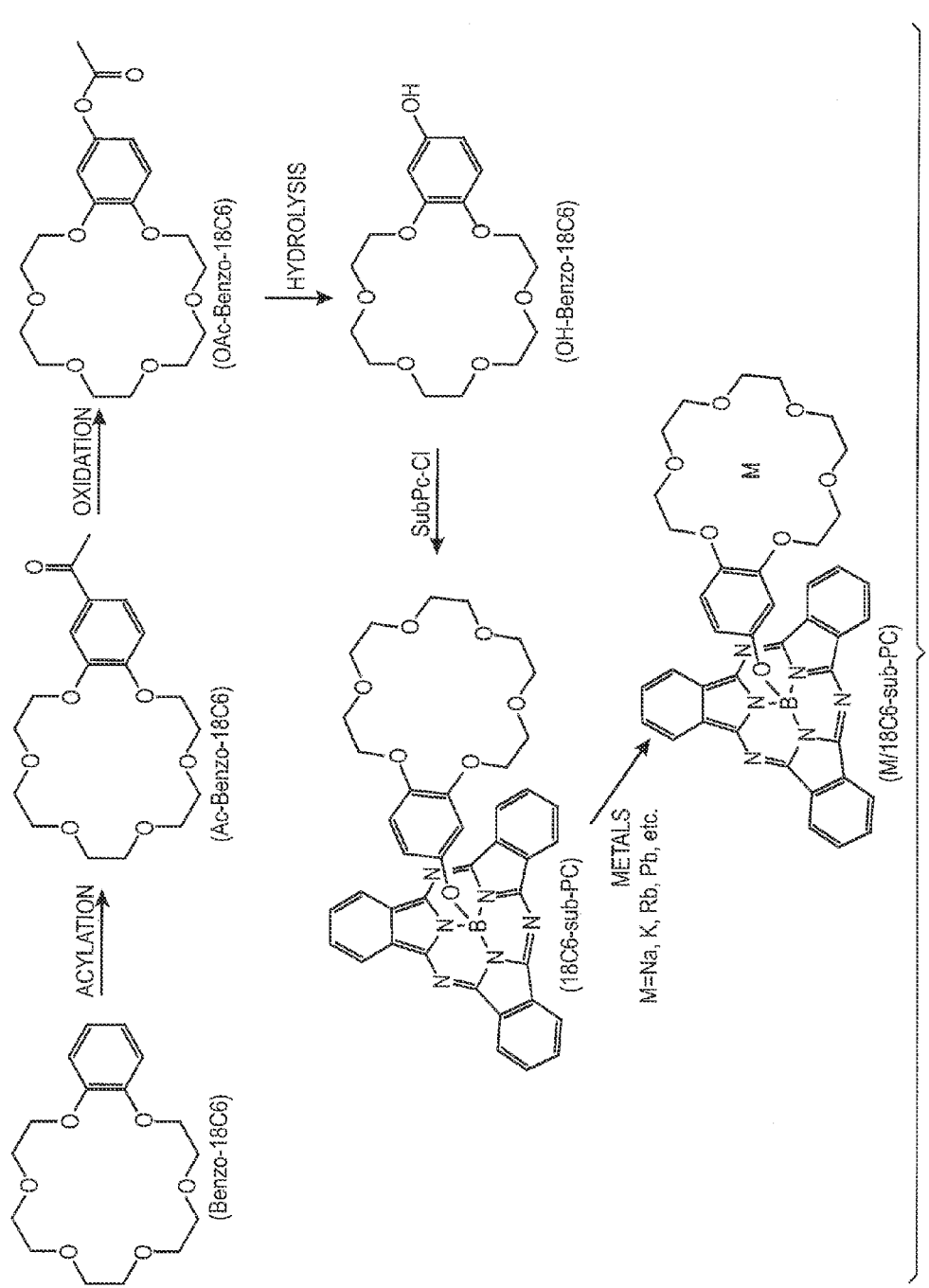
FIG. 8 is a schematic of a synthetic route for producing metal-substituted 18-crown-6 ether-based RSA dyes, in accordance with aspects of the present disclosure.

The synthesis routes, shown in FIGS. 7 and 8, are provided as examples of synthesizing M-sub-PC crown-ether derivatives (e.g., $RSA_1$ and $RSA_2$) having an absorption minimum (i.e., RSA behavior) at 405 nm. The 15C5 and 18C6 crown ether M-sub-PC derivatives were prepared. Generally speaking, the synthesis scheme follows a series of steps starting from Benzo-15C5 (or Benzo-18C6 for FIG. 8) through acylation, oxidation, hydrolysis, condensation and metal incorporation, respectively, to obtain the M-sub-PC structure.

Synthesis of Metallated 15-crown-5 ether Subphthalocyanine (M/15C5-sub-PC) Derivatives For the acylation reaction, a three neck flask was charged with polyphosphoric acid/acetic acid (3 g/7 g), Benzo-15C5 (4.5 g, 16.77 mmol), acetic anhydride (7.5 g, 3.5 equs, 58.7 mmol). The reaction mixture was stoppered, kept under nitrogen atmosphere, heated at 45° C., and left to stir overnight. The dark brown reaction mixture was washed twice with water (100 mL). The organic products were taken into methylene chloride (100 mL) and dried over $MgSO_4$. The product was chromatographed on $SiO_2$ with EtOAC: Hexane=40:60 ratio eluent. The product, Ac-Benzo-15C5, was isolated as pale white solid (4.5 g). $^1$H NMR (CDCl$_3$) δ: 7.59 (d, 1H), 7.56 (s, 1H), 6.9 (d, 1H), 4.22 (m, 4H), 3.9-4.0 (m, 4H), 3.8 (s, 8H), 2.59 (s, 3H).

For the oxidation step, a single neck round bottom flask was charged with Ac-Benzo-15C5 (4.5 g, 14.5 mmol), 20 mL CH$_2$Cl$_2$ and metachloroperbenzoic acid (mCPBA) 1.3 equs (3.25 g, 18.87 mmol). The reaction mixture was stoppered, kept under nitrogen atmosphere, and left to stir overnight. The yellow precipitate reaction mixture was washed with saturated NaHCO$_3$ and then twice with water (100 mL). The organic products were taken into methylene chloride (100 mL) and dried over MgSO$_4$. The product, OAc-Benzo-15C5, was isolated as yellow solid (4.51 g) and used without any further purification. $^1$H NMR (CDCl$_3$) δ: 6.9 (d, 1H), 7.63 (s, 1H), 6.62 (d, 1H), 4.16 (m, 4H), 3.9 (m, 4H), 3.8 (s, 8H), 2.3 (s, 3H).

For the hydrolysis step, a single neck round bottom flask was charged with OAc-Benzo-15C5 (3.0 g, 13.8 mmol), and hydrolyzed under refluxing conditions with aqu. NaOH (10% solution) and the reaction mixture were stirred for 3 hours under nitrogen blanket. The reaction mixture was washed with saturated NaHCO$_3$ and then with water twice (50 mL). The organic products were taken into methylene chloride (50 mL) and dried over MgSO$_4$. The product, OH-Benzo-15C5, (0.6 g) was obtained was used without any further purification. $^1$H NMR (CDCl$_3$) δ: 6.75 (d, 1H), 6.44 (s, 1H), 6.35 (d, 1H), 4.1 (m, 4H), 3.9 (m, 4H), 3.78 (s, 8H).

For the condensation step, a single neck round bottom flask was charged with subphthalocyanine chloride (0.7 g) and OH-Benzo-15C5 (0.55 g, 1.95 mmol) and 10 mL toluene. The flask was fitted to a water cooled condenser and the reaction mixture was placed in a hot oil bath and refluxed for 3 days under a nitrogen blanket. The reaction mixture was cooled and diluted with 20 mL chloroform, washed with 10% NaOH solution, followed by a water wash. Later, the reaction mixture was suction filtered to remove an unreacted subphthalocyanine chloride, followed by drying the solution with $MgSO_4$. The filtrate solution was removed on a rotary evaporator and dried to isolate the pink product, 15C5-sub-PC, (0.25 g). $^1$H NMR ($CDCl_3$) δ: 8.94 (m, 6H), 7.98 (m, 6H), 6.3 (d, 1H), 5.0 (s, 1H), 4.9 (d, 1H), 4.2 (m, 4H), 3.9 (m, 4H), 3.6 (bs, 8H). Mass analysis: Electron Spray ToF-MS Pos Ion/90:10 acetonitrile/2 mM ammonium formate pH=8. 15C5-sub-PC $[M+H]^+$=679; MALDI (with DCTB matrix and or HBN matrix): 15C5-sub-PC $[M]^+$=678.

Metals were incorporated into the crown ether by using the following reaction procedure. The 15C5-sub-PC (100 mg) was dissolved in 2 mL EtOH taken in a 50 ml, round bottom flask and 1 equivalent of the metal salt (i.e., either NaI, KI, RbI or $PbNO_3$) was added and stirred overnight at room temperature. The solution was later filtered through Whatmann course filter paper to remove any unreacted salts and the filtrate solvent was removed on a rotary evaporator. The product, M/15C5-sub-PC (i.e., Na/15C5-sub-PC, K/15C5-sub-PC, Rb/15C5-sub-PC, or Pb/15C5-sub-PC), was isolated in near quantitative yield. $^1$H NMR of K/15C5-sub-PC ($CDCl_3$) δ: 8.94 (m, 6H), 7.98 (m, 6H), 5.9 (broad s, 1H), 4.95 (broad s, 1H), 4.9 (broad d, 1H), 4.0-3.4 (broad peaks, 16H). Mass analysis: Electron Spray ToF-MS Pos Ion/90:10 acetonitile/2 mM ammonium formate pH=8. K/15C5-sub-PC $[M]^+$=717; RbI/15C5-SubPc $[M]^+$=763. MALDI (with DCTB matrix and or HBN matrix): K/15C5-sub-PC $[M]^+$=717; Rb/15C5-sub-PC $[M]^+$=763.

Synthesis of Metallated 18-crown-6 Ether Subphthalocyanine (M/18C6-sub-PC) Derivatives For the acylation step, a three neck flask was charged with polyphosphoric acid/acetic acid (2 g/10.49 g), Benzo-18C6 (5 g, 16 mmol), acetic anhydride (8.16 g, 5 equs, 80 mmol). The reaction mixture was stoppered, kept under nitrogen atmosphere, heated at 45° C., and left to stir overnight. The dark brown reaction mixture was washed twice with water (100 mL). The organic products were taken into methylene chloride (100 mL) and dried over $MgSO_4$. The product was chromatographed on $SiO_2$ with EtOAC: Hexane=40:60 ratio eluent. The product, Ac-Benzo-18C6, was isolated as pale white solid (5.2 g). $^1$H NMR ($CDCl_3$) δ: 7.59 (d, 1H), 7.56 (s, 1H), 6.9 (d, 1H), 4.22 (m, 4H), 3.9-4.0 (m, 4H), 3.6-3.8 (m, 12H), 2.6 (s, 3H).

For the oxidation step, a single neck round bottom flask was charged with Ac-Benzo-18C6 (4.7 g, 13.27 mmol), 20 mL $CH_2Cl_2$ and metachloroperbenzoic acid (mCPBA) 1.5 equs (2.5 g, 19.9 mmol). The reaction mixture was stoppered, kept under nitrogen atmosphere, and left to stir overnight. The yellow precipitate reaction mixture was washed with saturated $NaHCO_3$ and then twice with water (100 mL). The organic products were taken into methylene chloride (100 mL) and dried over $MgSO_4$. The product, OAc-Benzo-18C6, was isolated as yellow solid (4.71 g) and used without any further purification. $^1$H NMR ($CDCl_3$) δ: 6.9 (d, 1H), 6.63 (s, 1H), 6.62 (d, 1H), 4.20 (m, 4H), 3.9 (m, 4H), 3.8-3.6 (m, 12H), 2.3 (s, 3H).

For the hydrolysis step, a single neck round bottom flask was charged with OAc-Benzo-18C6 (1.2 g, 3.24 mmol), and hydrolyzed under refluxing conditions with aq. NaOH (10% solution) and the reaction was stirred for 3 hrs under a nitrogen blanket. The reaction mixture was washed with saturated $NaHCO_3$ and then twice with water (50 mL). The organic products were taken into methylene chloride (50 mL), dried over $MgSO_4$. The product, OH-Benzo-18C6, (0.6 g) was obtained was used without any further purification.

For condensation reaction, subphthalocyanine chloride and OH-Benzo-18C6 (3.0 g) were added to a single neck round bottom flask in stoichiometric equivalents and dissolved in 10 mL toluene. The flask was fitted to a water cooled condenser and the reaction mixture was placed in a hot oil bath and refluxed conditions for 3 days under a nitrogen blanket. The reaction mixture was cooled, diluted with 20 mL chloroform, washed with 10% NaOH, followed by washing with water. Later, the reaction mixture was suction filtered to remove any unreacted subphthalocyanine chloride, followed by drying the solution using $MgSO_4$ to yield a pink compound, 18C6-sub-PC. The filtrate solution was removed on a rotary evaporater and dried. $^1$H NMR of 18C6-sub-PC ($CDCl_3$) δ: 8.9 (m, 6H), 7.98 (m, 6H), 6.69 (d, 1H), 6.67 (s, 1H), 6.4 (d, 1H), 4.0-3.6 (m, 20H).

Metals were incorporated into the crown ether using the following reaction procedure. The 18C6-sub-PC (30 mg, $3 \times 10^{-3}$ mmol) was dissolved in 2 mL EtOH taken in a 50 mL round bottom flask and 1 equivalent of the metal salt (i.e., NaI, KI, RbI or $PbNO_3$) was added and the reaction was stirred overnight at room temperature. The solution was later filtered through Whatmann course filter paper to remove any unreacted salts and the filtrate solvent was removed on a rotary evaporator to give a pink product, M/18C6-sub-PC. $^1$H NMR of Pb/18C6-sub-PC ($CDCl_3$) δ: 8.9 (m, 6H), 7.98 (m, 6H), 6.79 (d, 1H), 6.78 (s, 1H), 6.5 (d, 1H), 4.2-3.8 (m, 20H). Mass analysis: Electron Spray ToF-MS Pos Ion/90:10 acetonitile/2 mM ammonium formate pH=8. MALDI (with DCTB matrix and HBN matrix): $PbNO_3$/18C6-sub-PC $[M]^+$=1020.

Additionally, Table 1 indicates certain absorption characteristics of a number of RSA dyes based on UV/Vis absorption analysis in chloroform. More specifically, the $\lambda_{max}$, $\epsilon_{max}$, and $\epsilon_{405}$ values for a number of 15C5-sub-PC RSA dyes and a Pb/18C6-sub-PC RSA dye are included.

TABLE 1

| Crown SubPcs | $\lambda_{max}$/nm$^a$ | $\epsilon_{max}$/$M^{-1}cm^{-1}$ | $\epsilon_{405\,nm}$/$M^{-1}cm^{-1}$ |
|---|---|---|---|
| 15C5-sub-PC | 562 | 52390 | 436 |
| K/15C5-sub-PC | 562 | 48986 | 449 |
| Rb/15C5-sub-PC | 564 | 59943 | 407 |
| Pb/18C6-sub-PC | 566 | 48009 | 331 |

Microhologram Recording

As discussed in detail below, the inclusion $R^1$, with its metal bearing functionality ($X^4$) affords improved sensitivity over the sub-PC structure alone. That is, the presently disclosed M-sub-PC embodiments afford higher quantum efficiencies using recording light of lower intensity than the previously disclosed sub-PC structure. While not wishing to be limited to any particular mechanism, generally speaking, the presence of metal atoms is believed to enhance the rate of intersystem crossing (ISC) (e.g., ISC 24), which in turn, may afford the observed enhanced quantum efficiency of the system. One way of measuring the sensitivity of an RSA dye is to determine the change in the refractive index of an optical medium utilizing the RSA dye as a function of the intensity of actinic light used to record data to the optical medium. Refractive index measurements may be performed using an ellipsometer to measure bulk materials (e.g., using spin coated samples). Thus, the reactive materials used in these applications may be tested to determine the net change in the refractive index, Δn, of the material by measuring the refractive index, n, of the sample before and after exposure to actinic radiation of varying intensity (constant fluence).

Figure 9:
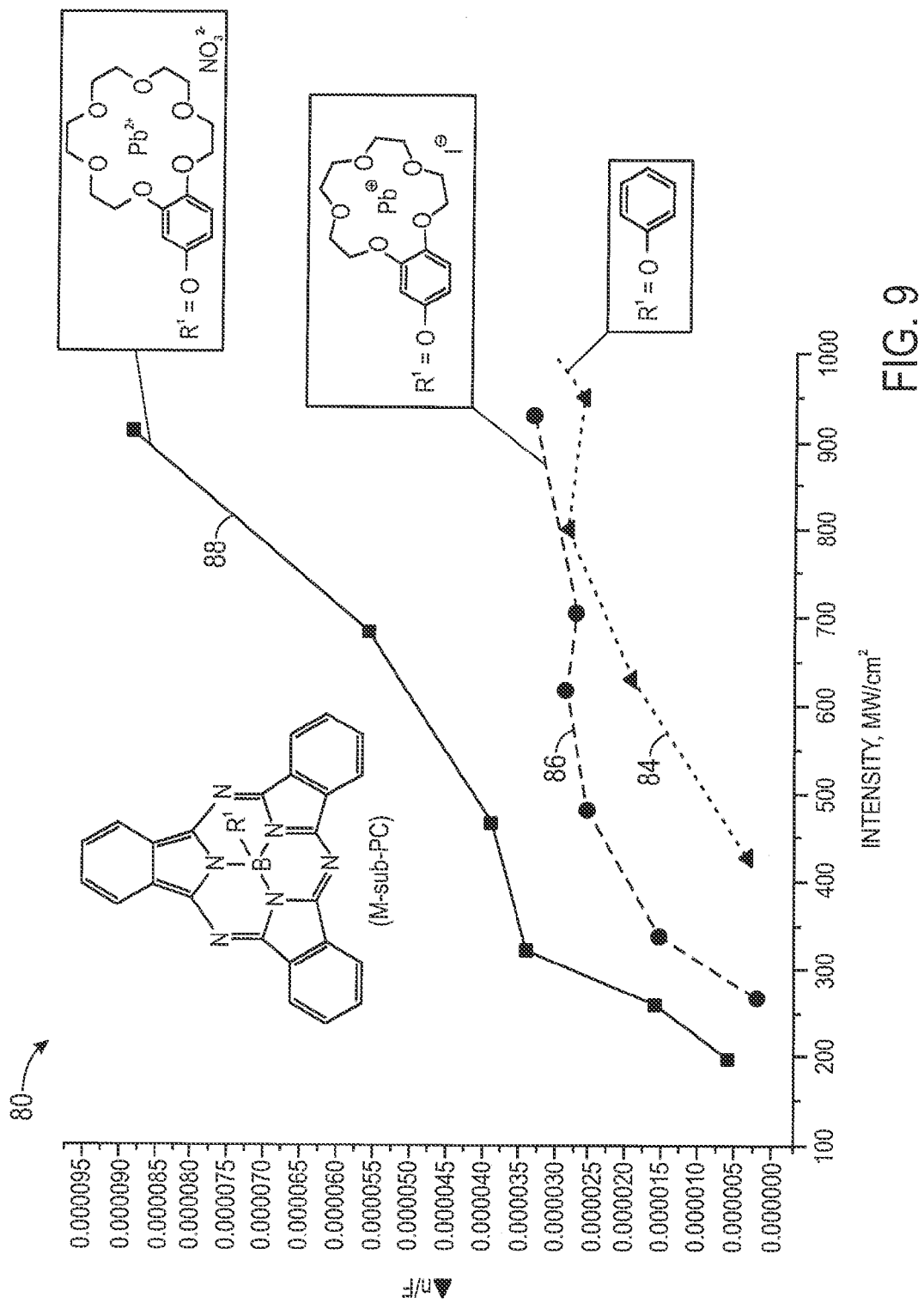
FIG. 9 is a graph illustrating the change in the refractive index of three different optical media being exposed to recording light of varying intensity, in accordance with aspects of the present disclosure.

For example, FIG. 9 is a graph 80 illustrating the change in the refractive index of different optical media being exposed to actinic radiation (e.g., around 405 nm) of varying intensity (constant fluence). More specifically, FIG. 9 illustrates curves for three different optical media, as described above, each utilizing a different RSA dye having the M-sub-PC general structure. As illustrated, the curve 84 corresponds to the general M-sub-PC structure, where R is a phenoxy group. That is, curve 84 reflects the Δn of an irradiated optical medium that includes a non-metallated-sub-PC as the RSA dye. In contrast, curves 86 and 88 reflect the Δn of irradiated optical media that utilize metallated-sub-PC sensitizers. In particular, curve 86 depicts the Δn of an irradiated optical medium that uses a M-sub-PC RSA dye, where $R^1$ comprises $X^2$, $X^3$, $X^4$, $X^5$, and M; and where $X^2$ is an oxygen atom; $X^3$ is an arene linker; $X^4$ is a 15-crown-5 ether-based metal binding portion; M is a rubidium atom; $X^5$ is an iodide counter-ion (i.e., Rb/15C5-sub-PC). Furthermore, curve 88 depicts the Δn of an irradiated optical medium that uses a M-sub-PC RSA dye, where $R^1$ comprises $X^2$, $X^3$, $X^4$, $X^5$, and M; and where $X^2$ is an oxygen atom; $X^3$ is an arene linker; $X^4$ is a 18-crown-6 ether-based metal binding portion; M is a lead atom; $X^5$ is a nitrate counter-ion (i.e., Pb/18C6-sub-PC).

Generally speaking, the sensitivity of each optical medium may be assessed by considering how much the refractive index of each optical medium changes when irradiated using actinic light of relatively low intensity. As such, the three curves of FIG. 9 (e.g., 84, 86, and 88) may be compared to assess the relative sensitivity of the three corresponding RSA dye structures. For curve 84, representing the sub-PC structure alone (i.e., not metal substituted), a Δn of approximately $4.0 \times 10^{-6}$ is observed when using recording light of approximately 425 MW/cm². In contrast, curve 86, corresponding to the Rb/15C5-sub-PC RSA dye, illustrates a Δn of approximately $2.2 \times 10^{-5}$ when using recording light of approximately the same intensity. Furthermore, curve 88, corresponding to the Pb/18C6-sub-PC RSA dye, illustrates a Δn of approximately $3.7 \times 10^{-5}$ when using recording light of approximately the same intensity. Accordingly, a substantial improvement in sensitivity is observed for the holographic media utilizing M-sub-PC RSA dyes compared to the medium utilizing the non-metal substituted sub-PC RSA dye structure. That is, an approximately five-fold to nine-fold increase in the Δn of holographic media utilizing M-sub-PC RSA dyes is observed when the media is exposed to recording light of low intensity.

Figure 10:
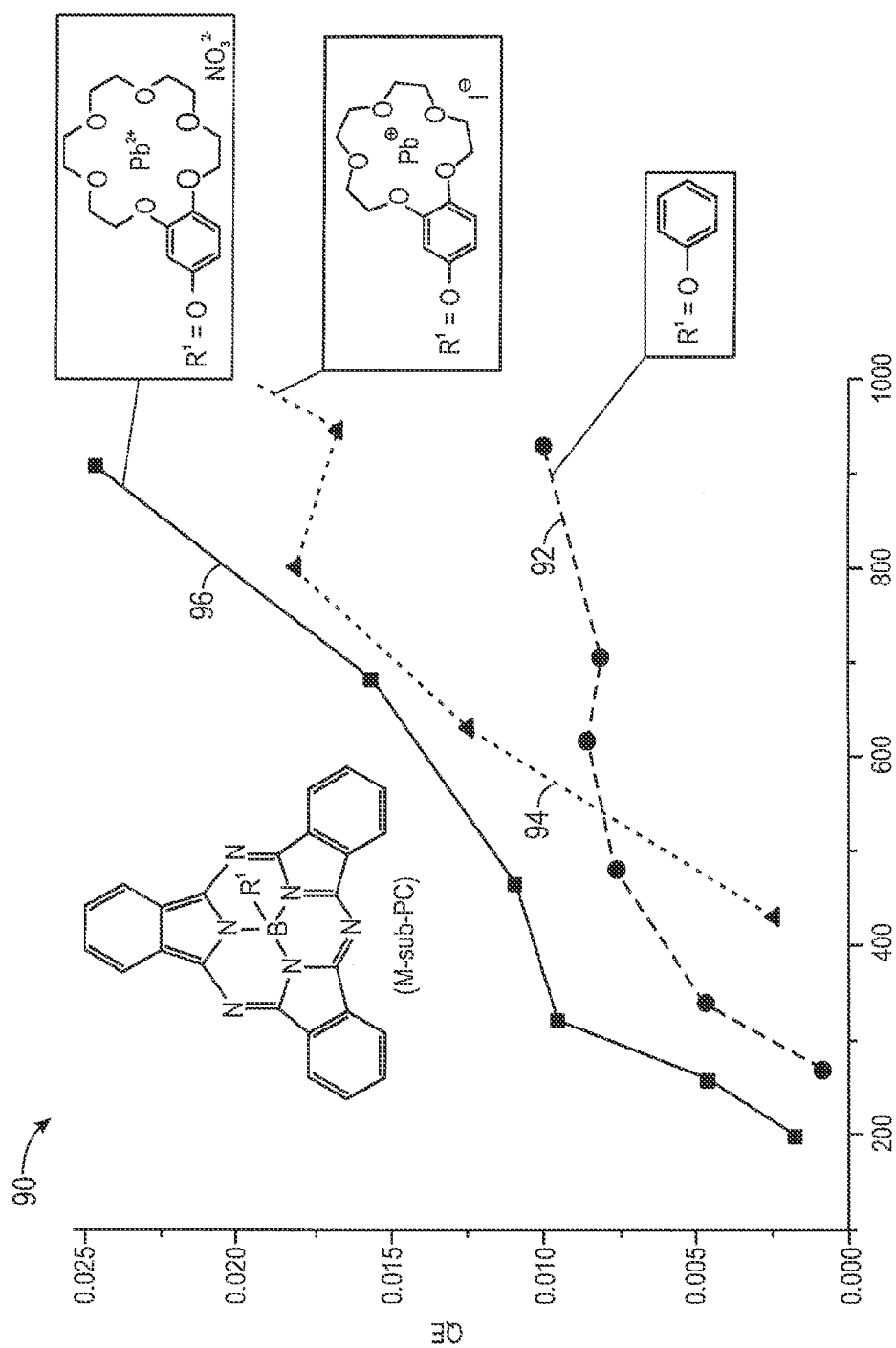
FIG. 10 is a graph illustrating the quantum efficiency of three different optical media being exposed to recording light of varying intensity, in accordance with aspects of the present disclosure.
Figure 11:
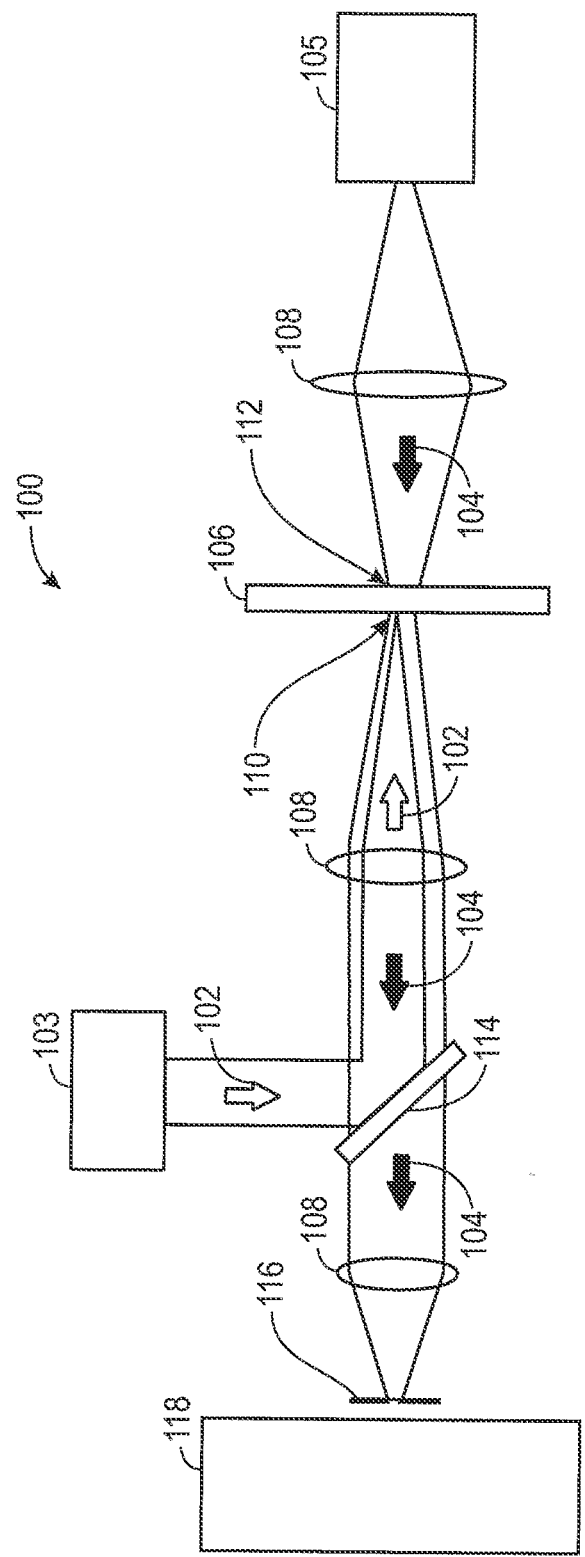
FIG. 11 is a schematic illustrating an embodiment of a quantum efficiency measurement setup for performing the quantum efficiency measurement.

Furthermore, the quantum efficiency for each of the optical media illustrated in FIG. 9 may also be determined. More specifically, these quantum efficiencies (which are discussed in detail below with respect to FIG. 10) may be determined using a quantum efficiency measurement setup, such as the one illustrated in FIG. 11. That is, FIG. 11 illustrates a schematic of an embodiment of a quantum efficiency measurement setup 100 for performing the quantum efficiency measurement. In the illustrated setup 100, a pump beam 102 (e.g., from a laser source 103 capable of producing light having a wavelength of approximately 405 nm) and UV probe beam 104 (e.g., from a UV lamp 105 capable of producing wavelengths of approximately 280 nm to 360 nm) are incident on a sample 106 in a counter-propagating geometry. The beams 102 and 104 may be focused on a surface of the sample 106 by a number of respective objectives and/or lenses 108 (e.g., microscope UV objectives and UV quartz lenses with UV anti-reflecting coatings). Additionally, the spot 110 of the focused pump beam 102 (which may be approximately 20 um in diameter at the surface of the sample 106) and the spot 112 of the focused UV probe beam 104 may be configured to overlap at the surface of the sample 106. Furthermore, after the UV probe beam 104 has traversed the sample 106, UV probe beam 104 passes a dichromic mirror 114 and is subsequently focused by a number of objectives and/or lenses 108 (e.g., a UV objective) onto the approximately 20 um pinhole entrance 116 to a UV/Vis spectrometer 118. The collecting optics may be configured to have magnification close to 1 and, therefore, the spot 110 may be imaged using a detector pinhole of the approximately the same size (e.g., approximately 20 um), resulting in a confocal detection configuration. As such, the diameter of the spot 112 of the focused UV probe beam 104 may be larger than the spot 110 of the focused pump beam 102; however, the confocal geometry of the illustrated setup 100 may limit the probing region to approximately 20 um.

Figure 12:
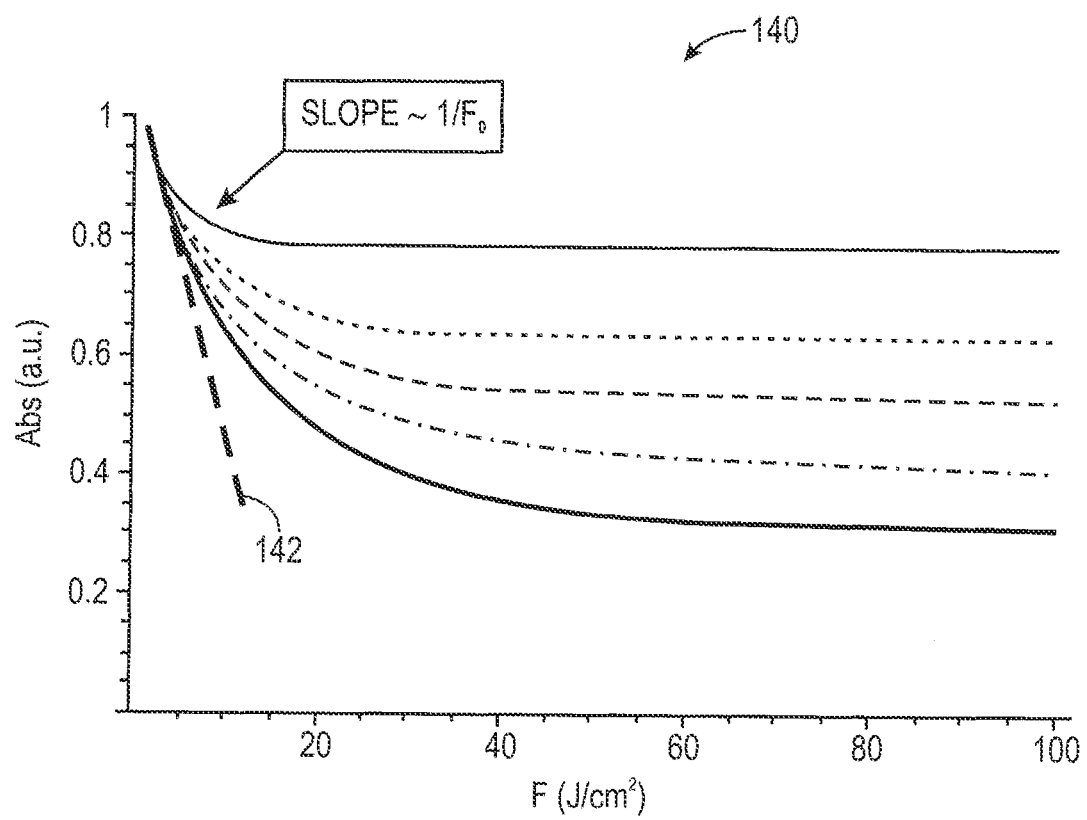
FIG. 12 is an embodiment of a graph illustrating an absorbance versus fluence plot.

The illustrated setup 100 enables measuring the change in the absorbance of the index change material (e.g., the sample 106) as a function of the fluence of the pump beam 102 using the UV probe beam 104. $F_0$, which may be considered the fluence number where the absorbance is zero, may be approximated using an absorbance versus fluence plot 140, illustrated in FIG. 12, using data obtained via the setup 100. In the illustrated plot 140, the slope of the illustrated line 142 approximately equals $1/F_0$. Using this derived $F_0$, the quantum efficiency, Q(I), of the energy transfer process may be calculated using the following equation:

$$Q(I) = \frac{h\nu}{F_0(I)\sigma_{RSA}(I)}, \quad \text{Eq. 1}$$

wherein $\sigma_{RSA}(I)$ is the RSA excited absorption cross section. For example, the quantum efficiency could be measured at different intensities to verify the threshold behavior of the sample 106.

The quantum efficiency for each of the optical media illustrated in FIG. 9 may also be determined using the setup 100 described above, with respect to FIG. 11. Accordingly, FIG. 10 is a graph 90 illustrating three curves (e.g., 92, 94, 96) corresponding to the quantum efficiencies of the three optical media described above, with respect to FIG. 9. As such, for curve 92, corresponding to the non-metal substituted sub-PC structure, a quantum efficiency of approximately 0.0025 at an intensity of approximately 425 MW/cm² is observed. In contrast, for curve 94, corresponding to the Rb/15C5-sub-PC RSA dye, a quantum efficiency of approximately 0.007 is observed at approximately the same intensity. Furthermore, for curve 96, corresponding to the Pb/18C6-M-sub-PC RSA dye, a quantum efficiency of approximately 0.011 is observed at approximately the same intensity. Accordingly, the improvement in the quantum efficiency when recording with an optical medium having a M-sub-PC RSA dye and low recording light intensity may range from approximately three-fold to more than four-fold.

Technical effects of the invention include the manufacture of holographic media having greater sensitivity and quantum efficiency than previously achieved. As described above, the disclosed M-sub-PC RSA dyes provide relatively high quantum efficiencies when using relatively low-intensity recording light. These improved sensitivities enable the writing of microholograms in the nanosecond time scale using low-intensity light around 405 nm, allowing many more layers of data to be written compared to other wavelengths (e.g., 532 nm). This enables the development of hologram-based, high-density data storage systems and devices.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An optical storage medium composition comprising:
   a polymer matrix;
   a reactant disposed within the polymer matrix and capable of undergoing a modification that alters the refractive index of the composition upon receiving an energy transfer from an excited sensitizer;
   a non-linear sensitizer disposed within the polymer matrix and comprising a subphthalocyanine (M-sub-PC) reverse saturable absorber configured to become excited upon exposure to light having an intensity above an intensity threshold and configured to transfer energy to the reactant, wherein the M-sub-PC comprises: a subphthalocyanine portion, a linker portion, a metal binding portion, and a metal portion, and wherein the metal portion comprises one or more of: indium, lead, zinc, tin, cesium, thallium, antimony, sodium, potassium, or rubidium.

2. The optical storage medium of claim 1, wherein the modification comprises a chemical reaction or a physical state-change of a portion of the composition.

3. The optical storage medium of claim 1, wherein the energy transfer comprises a radiative energy transfer, a non-radiative energy transfer, or any combination thereof.

4. The optical storage medium of claim 1, wherein the reactant comprises one or more of a stilbene derivative, a cinnamate derivative, a diphenylcyclopropene (DPCP) derivative, or a phase-change polymer.

5. The optical storage medium of claim 4, wherein the polymer matrix comprises a polymer chain and the reactant comprises one or more of a stilbene derivative, a cinnamate derivative, or a diphenylcyclopropene (DPCP) derivative coupled to the polymer chain.

6. The optical storage medium of claim 1, wherein the subphthalocyanine portion of the M-sub-PC comprises subphthalocyanato boron(III); 2,9,16-tribromosubphthalocyanato boron(III); 2,9,16-triiodosubphthalocyanato boron (III); trinitrosubphthalocyanato boron(III); 2,9,16-tri-tertbutylsubphthalocyanato boron(III); 2,9,17-tri-tert-butylsubphthalocyanato boron(III); or 2,9,16-triiodosubphthalocyaninato boron(III).

7. The optical storage medium of claim 1, wherein the metal binding portion comprises one or more of: a crown-ether derivative, diketone derivative, pyridine derivative, porphyrin derivative, calixarene derivative, or cyclodextrin derivative.

8. The optical storage medium of claim 1, wherein the M-sub-PC comprises a ligand portion comprising one or more of diketone ligands, nitrate ligands, alkyl ligands, pyridine-based ligands, or halide counter-ions.

9. The optical storage medium of claim 1, wherein the optical storage medium is capable of storing data as one or more microholograms on the optical storage medium, wherein the one or more microholograms are configured to store information about the intensity and phase of the light.

10. The optical storage medium of claim 1, wherein the optical storage medium comprises a non-linear sensitizer concentration between approximately 0.01 M and 0.1 M.

11. The optical storage medium of claim 1, wherein the optical storage medium comprises a non-linear sensitizer concentration of approximately 0.04 M.

12. The optical storage medium of claim 1, wherein the polymer matrix comprises one or more poly(alkyl methacrylates), poly(alkyl acrylates), polystyrenes, polycarbonates, poly acrylates, poly(vinylidene chlorides), or poly(vinyl acetates).

13. The optical storage medium of claim 1, wherein the M-sub-PC reverse saturable absorber is configured to respond to light having a wavelength of approximately 405 nm.

14. The optical storage medium of claim 1, wherein the linker portion is axially bound to a central boron atom of the subphthalocyanine portion of the M-sub-PC.

15. A triplet sensitizer having the formula:

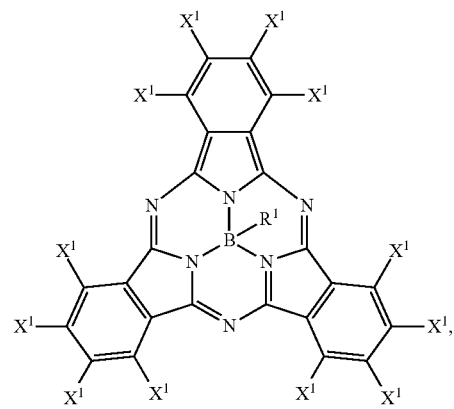

wherein:
   each $X^1$ independently comprises: a proton, a halide, a hydrocarbyl group having between 1 and 10 carbons, or an alkoxy group having between 1 and 10 carbons; and $R^1$ consists of: a linker portion comprising at least one oxygen atom; a metal binding portion; and a metal portion; wherein the sensitizer is a reverse saturable absorber (RSA) dye, and wherein $R^1$ comprises a crown-ether moiety or a diketone moiety.

16. The sensitizer of claim 15, wherein $R^1$ has the general formula:

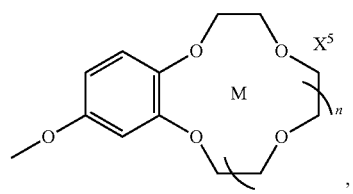

wherein:
   n is between 1 and 10; and M comprises indium, lead, zinc, tin, cesium, thallium, antimony, sodium, potassium, or rubidium; and $X^5$ comprises one or more ligands or counter ions.

17. The sensitizer of claim 16, wherein R$^1$ has the formula:

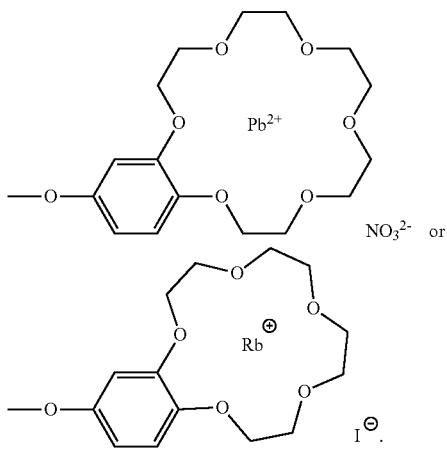

18. The sensitizer of claim 15, wherein R$^1$ has the general formula:

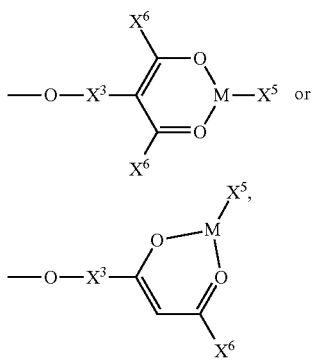

wherein:
each X$^6$ independently comprises: a proton, a hydrocarbyl group having between 1 and 10 carbons, a hydroxyl group, an amino group, an alkyl amino group having between 1 and 4 carbons, an alkoxy group having between 1 and 10 carbons, a phenoxy group, or a halide; X$^3$ comprises alkyl chain or an arene structure having between 1 and 10 carbons; M comprises indium, lead, zinc, tin, cesium, thallium, antimony, sodium, potassium, or rubidium; and X$^5$ comprises one or more ligands or counter ions.

19. The sensitizer of claim 18, wherein R$^1$ has the formula:

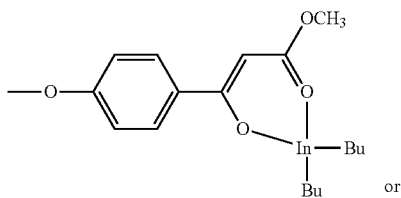

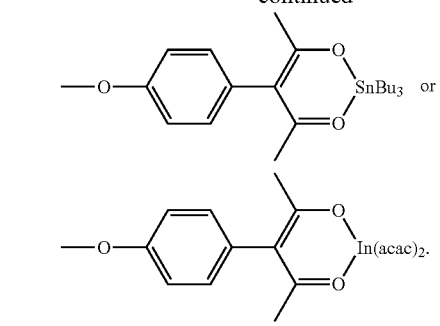

20. The sensitizer of claim 15, wherein the metal portion comprises one or more of indium, lead, tin, cesium, thallium, antimony, sodium, potassium, or rubidium.

21. A method for storing data on an optical medium comprising:
irradiating a portion of the optical medium with recording light having an intensity above an intensity threshold, wherein the optical medium comprises a subphthalocyanine (M-sub-PC) reverse saturable absorber (RSA) and a reactant disposed within a polymer matrix, wherein the M-sub-PC comprises: a subphthalocyanine portion, a linker portion coupled to both the subphthalocyanine portion and a metal binding portion, and a metal portion coupled to the metal binding portion;

exciting the M-sub-PC RSA to an excited triplet state with the recording light such that the excited M-sub-PC RSA sensitizes a modification of the reactant; and modifying the reactant such that the refractive index of the portion of the optical medium is altered, forming a hologram on optical medium, wherein the hologram stores information about the intensity and phase of the recording light.

22. The method of claim 21, comprising interrogating the portion of the optical medium using lower intensity light than the recording light such that the information stored in the hologram can be non-destructively recovered.

23. An optical storage medium composition comprising:
a polymer matrix;
a reactant disposed within the polymer matrix and capable of undergoing a modification that alters the refractive index of the composition upon receiving an energy transfer from an excited sensitizer;
a non-linear sensitizer disposed within the polymer matrix and comprising a subphthalocyanine (M-sub-PC) reverse saturable absorber configured to become excited upon exposure to light having an intensity above an intensity threshold and configured to transfer energy to the reactant, wherein the M-sub-PC comprises: a subphthalocyanine portion, a linker portion, a metal binding portion, and a metal portion, wherein the linker portion comprises an alkoxy or aryloxy moiety.

* * * * *